US012601072B2

(12) United States Patent
Yu et al.

(10) Patent No.: US 12,601,072 B2
(45) Date of Patent: Apr. 14, 2026

(54) COMPOSITE CONTAINING PLATINUM-ALKALINE EARTH METAL ALLOY, FUEL CELL AND WATER ELECTROLYSIS CELL CONTAINING THE COMPOSITE, AND METHOD OF PRODUCING THE COMPOSITE

(71) Applicant: DAEGU GYEONGBUK INSTITUTE OF SCIENCE AND TECHNOLOGY, Daegu (KR)

(72) Inventors: Jong-Sung Yu, Seoul (KR); Caleb Gyan-Barimah, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 589 days.

(21) Appl. No.: 17/977,322

(22) Filed: Oct. 31, 2022

(65) Prior Publication Data

US 2023/0175150 A1      Jun. 8, 2023

(30) Foreign Application Priority Data

Nov. 1, 2021      (KR) ......................... 10-2021-0147825

(51) Int. Cl.
*H01M 4/92*          (2006.01)
*C25B 1/04*          (2021.01)
(Continued)

(52) U.S. Cl.
CPC .............. *C25B 11/054* (2021.01); *C25B 1/04* (2013.01); *C25B 11/065* (2021.01);
(Continued)

(58) Field of Classification Search
CPC ............. B01J 37/02; B01J 37/04; B01J 37/08
See application file for complete search history.

(56) References Cited

U.S. PATENT DOCUMENTS

2016/0197358 A1*   7/2016   Arihara ................. H01M 4/926
                                                        502/185
2020/0381746 A1*  12/2020   Gu ........................ H01M 4/926
(Continued)

FOREIGN PATENT DOCUMENTS

KR      10-2016-0089269 A      7/2016
KR      10-2019-0072580 A      6/2019
(Continued)

OTHER PUBLICATIONS

Vej-Hansen et al, New Platinum Alloy Catalysts for Oxygen Electroreduction Based on Alkaline Earth Metals, DOI 10.1007/s12678-017-0375-9, Apr. 17, 2017.
(Continued)

*Primary Examiner* — Jun Li
(74) *Attorney, Agent, or Firm* — HARNESS, DICKEY & PIERCE, P.L.C.

(57)               ABSTRACT

The present invention relates to a composite that is-cost-effective, has an excellent catalytic activity, and significantly improves stability compared to a pure platinum catalyst according to the related art. Specifically, the composite according to the present invention contains a carbon support and a binary alloy consisting of platinum and an alkaline earth metal supported on the carbon support which satisfies a specific condition in a Pt 4f X-ray photoelectron spectroscopy (XPS) spectrum of the binary alloy.

10 Claims, 8 Drawing Sheets

(51) Int. Cl.

| | |
|---|---|
| *C25B 11/054* | (2021.01) |
| *C25B 11/065* | (2021.01) |
| *C25B 11/089* | (2021.01) |
| *H01M 4/86* | (2006.01) |

(52) U.S. Cl.
CPC ........... *C25B 11/089* (2021.01); *H01M 4/921* (2013.01); *H01M 4/926* (2013.01); *H01M 2004/8689* (2013.01)

(56) References Cited

U.S. PATENT DOCUMENTS

| | | | |
|---|---|---|---|
| 2021/0036334 A1* | 2/2021 | Kon ....................... | H01M 4/921 |
| 2021/0094021 A1* | 4/2021 | Stamenkovic ........... | B01J 37/08 |
| 2021/0126264 A1* | 4/2021 | Matsutani ........... | H01M 8/1018 |
| 2021/0275993 A1* | 9/2021 | Leidinger ............. | H01M 4/926 |
| 2022/0258231 A1* | 8/2022 | Kitagawa ................. | B01J 35/45 |

FOREIGN PATENT DOCUMENTS

| | | | |
|---|---|---|---|
| KR | 10-2020-0023080 A | 3/2020 | |
| KR | 10-2020-0113333 A | 10/2020 | |
| KR | 20200113333 A | * 10/2020 | ........... H01M 4/926 |

| | | | | |
|---|---|---|---|---|
| WO | WO-2010088902 A2 | * | 8/2010 | ............... C22C 1/00 |
| WO | WO-2018073367 A1 | * | 4/2018 | ........... H01M 4/885 |
| WO | WO-2019208310 A1 | * | 10/2019 | ............. B01J 37/26 |

OTHER PUBLICATIONS

Saha et al. "Reply to the 'Comment on Trimorphs of 4-bromophenyl 4-bromobenzoate. Elastic, brittle, plastic' by J. J. Whittaker, A. J. Brock, A. Grosjean, M. C. Pfrunder, J. C. McMurtrie and J. K. Clegg, *Chem. Commun.*, 2021, 57, DOI: 10.1039/ D0CC07668F." *Chem. Commun.*, Royal Society of Chemistry, Apr. 19, 2021.

Kanady et al. "Synthesis of Pt3Y and Other Early-Late Intermetallic Nanoparticles by Way of a Molten Reducing Agent." *J. Am. Chem. Soc.* (2017): pp. 5672-5675.

Korean Office Action dated Oct. 13, 2023 for corresponding Korean Patent Application No. 10-2021-0147825.

Chinese Office Action dated Aug. 12, 2025 for corresponding Chinese Patent Application No. 202280007850.7 and its English-language translation.

Itahara Hiroshi et al., Eutectic salt mixture-assisted sodium-vapor-induced synthesis of Pt—Ca nanoparticles, and their microstructural and electrocatalytic properties. Chem Commun (Camb). Apr. 29, 2021;57(35):4279-4282. doi: 10.1039/d1cc01359a. PMID: 33913973 (Abstract Only).

* cited by examiner

COMPOSITE CONTAINING PLATINUM-ALKALINE EARTH METAL ALLOY, FUEL CELL AND WATER ELECTROLYSIS CELL CONTAINING THE COMPOSITE, AND METHOD OF PRODUCING THE COMPOSITE

CROSS-REFERENCE TO RELATED APPLICATIONS

This application claims priority under 35 U.S.C. § 119 to Korean Patent Application No. 10-2021-0147825, filed on Nov. 1, 2021, in the Korean Intellectual Property Office, the disclosure of which is incorporated herein by reference in its entirety.

TECHNICAL FIELD

The following disclosure relates to a composite containing a platinum-based alloy, a fuel cell and a water electrolysis cell containing the composite, and a method of producing the composite, and more particularly, to a composite containing a platinum-based alloy that has an excellent catalytic activity for an oxygen reduction reaction or a hydrogen evolution reaction and has significantly improved durability, a fuel cell and a water electrolysis cell containing the composite, and a method of producing the composite.

BACKGROUND

In a fuel cell and a water electrolysis cell, which are eco-friendly energy conversion devices, an electrocatalyst is essentially used to improve energy conversion efficiency.

As an example, in the case of a proton exchange membrane fuel cell (PEMFC), platinum (Pt) is mainly used as an electrocatalyst to promote an oxygen reduction reaction (ORR) at a cathode and a hydrogen oxidation reaction (HOR) at an anode. In particular, since the oxygen reduction reaction at the cathode proceeds at a slower rate than the hydrogen oxidation reaction at the anode, and the reaction rate determines the overall performance of the fuel cell. A pure platinum catalyst is mainly used currently to promote the oxygen reduction reaction at the cathode.

However, platinum as a precious metal has limitations in large-scale applications due to its high price and scarcity. In order to overcome this problem, studies on a platinum-based catalyst obtained by alloying platinum with a second metal such as cobalt, nickel, iron, manganese, or copper have been actively conducted.

Korean Patent Laid-open Publication No. 10-2020-0023080 discloses an alloy nanoparticle catalyst obtained by alloying platinum and a transition metal, but there is still a need for improvement in terms of activity, durability, and cost-effectiveness.

Therefore, in order to increase the efficiency of the fuel cell, it is required to provide a catalyst having improved activity and durability as well as a lower cost.

An alkaline earth metal has the advantage of being significantly abundant in nature and relatively inexpensive compared to other metals, but it is significantly difficult to synthesize as an alloy with platinum because the difference in reduction potential between platinum and the alkaline earth metal is large, due to the high negative standard reduction potential of the alkaline earth metal. In particular, since the synthesis of a particulate platinum-alkaline earth metal alloy is difficult, an alloy particle is rarely reported in the documents. Conversely, when a novel synthesis method capable of preparing such an alloy particle is developed by overcoming the difference in reduction potential, this alloy may be a novel platinum-based alloy material that may have both excellent stability and activity because significantly large energy would be required to disintegrate such an alloy.

Therefore, there is a demand for the development of a platinum-based alloy catalyst that may be practically applied to a fuel cell not only because it has excellent activity and durability but also because it is cost-effective.

RELATED ART DOCUMENT

Patent Document

Korean Patent Laid-Open Publication No. 10-2020-0023080

SUMMARY

An embodiment of the present invention is directed at providing a composite having an excellent catalytic activity and stability as well as cost-effectiveness.

Another embodiment of the present invention is directed at providing a catalyst for an oxygen reduction reaction and a water electrolysis cell and a cathode for a fuel cell and a water electrolysis cell, the catalyst and the cathode containing the composite of the present invention.

Still another embodiment of the present invention is directed at providing a fuel cell and a water electrolysis cell including the cathode for a fuel cell and a water electrolysis cell of the present invention.

Still another embodiment of the present invention is directed at providing a method of producing the composite of the present invention.

In one general aspect, a composite contains a carbon support; and a binary alloy composed of platinum (Pt) and an alkaline earth metal anchored on the carbon support, wherein in a Pt 4f XPS spectrum of the binary alloy measured by X-ray photoelectron spectroscopy (XPS), E1 and E2 defined by the following Expressions 1 and 2, respectively, satisfy the following Expression 3:

$$E1 = E0 - E0(\text{ref}) \tag{Expression 1}$$

$$E2 = EII - EII(\text{ref}) \tag{Expression 2}$$

$$E1/E2 \leq 0.85 \tag{Expression 3}$$

In Expressions 1 and 2, E0(ref) and EII(ref) are the binding energy (center) of a Pt(0) peak and the binding energy (center) of a Pt(II) peak, respectively, in a Pt 4f XPS spectrum of pure platinum (Pt). E0 and EII are the binding energy (center) of a Pt(0) peak and the binding energy (center) of a Pt(II) peak, respectively, in the Pt 4f XPS spectrum of the binary alloy.

The alkaline earth metal may be one or more selected from calcium (Ca), magnesium (Mg), strontium (Sr), barium (Ba), radium (Ra), and beryllium (Be).

The atomic ratio of the alkaline earth metal to the platinum (Pt) in the binary alloy may be 1:1 to 1:5.

The binary alloy may be one or more selected from particulate PtSr, $Pt_2Ca$, $Pt_3Mg$, and $Pt_5Ba$.

The particle size of a particulate binary alloy may be 3 to 300 nm.

The binary alloy may have a cubic crystal phase.

The binary alloy may further contain a platinum overlayer formed on the surface of the binary alloy.

In another general aspect, a catalyst for an oxygen reduction reaction (ORR) or a hydrogen evolution reaction (HER) contains the composite.

In still another general aspect, a cathode for a fuel cell or a water electrolysis cell contains the composite.

In still another general aspect, an energy conversion device that is a fuel cell or a water electrolysis cell includes the cathode.

In still another general aspect, a method of producing the composite includes: a step a) of preparing a mixture containing a platinum precursor, an alkaline earth metal precursor, a first reducing agent, and an aprotic organic solvent; a step b) of preparing a colloid containing a synthetic product by performing a first heat treatment on the mixture at a temperature equal to or higher than a boiling point of the organic solvent and then naturally cooling the mixture; a step c) of obtaining the synthetic product by centrifuging the colloid; a step d) of applying the synthetic product onto a carbon support, mixing the synthetic product with a powdery second reducing agent, and then performing a second heat treatment in an inert reducing atmosphere to induce alloying between platinum and an alkaline earth metal; and a step e) of removing impurities included in the alloyed synthetic product through an acid treatment.

The steps a), b), and d) may be performed under anhydrous and anoxic conditions.

The first heat treatment in the step b) may be performed for 11 to 30 hours.

The synthetic product in the step b) may contain crystalline platinum (Pt) and an amorphous alkali metal.

The second heat treatment may be performed at a temperature of 300 to 1,000° C.

The alkaline earth metal precursor may be a chloride containing one or more selected from calcium (Ca), magnesium (Mg), strontium (Sr), barium (Ba), radium (Ra), and beryllium (Be).

The aprotic organic solvent may be one or more selected from acetonitrile, dimethylacetamide (DMAc), dimethylformamide (DMF), dimethyl sulfoxide (DMSO), methyl ethyl ketone, methyl n-propyl ketone, N-methylpyrrolidone (NMP), propylene carbonate, nitromethane, sulfolane, and hexamethylphosphoramide (HMP).

A platinum overlay may be formed on the surface of the alloyed synthetic product by the acid treatment in the step e).

Other features and aspects will be apparent from the following detailed description, the drawings, and the claims.

BRIEF DESCRIPTION OF THE DRAWINGS

before a second heat treatment.

DETAILED DESCRIPTION OF EMBODIMENTS

Figure 1:
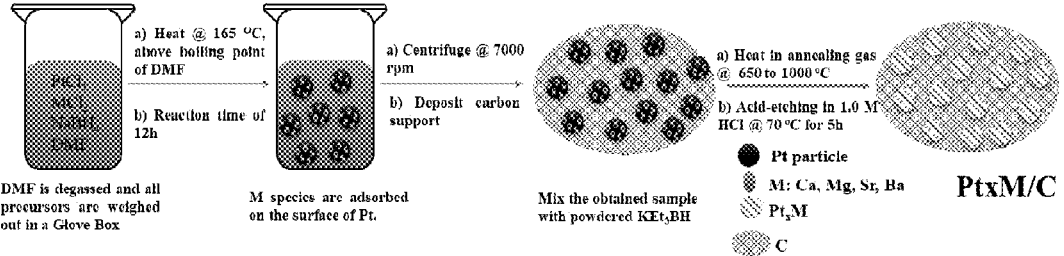
FIG. 1 is a schematic view illustrating the process of producing a composite according to an exemplary embodiment of the present invention.

Hereinafter, a composite of the present invention will be described in detail with reference to the accompanying drawings. The drawings to be provided below are provided by way of example so that the spirit of the present invention can be sufficiently transferred to those skilled in the art. Therefore, the present invention is not limited to the drawings to be provided below, but may be modified in many different forms. In addition, the drawings provided below may be exaggerated in order to highlight the importance of the present invention. Technical terms and scientific terms used herein have the general meanings understood by those skilled in the art to which the present invention pertains unless otherwise defined, and a description for the known function and configuration unnecessarily obscuring the gist of the present invention will be omitted in the following description and the accompanying drawings.

In addition, unless the context clearly indicates otherwise, singular forms used in the specification and the scope of the appended claims are intended to include plural forms.

The terms "comprise(s)", "include(s)", "have (has)", and the like used in the present specification and the scope of the appended claims indicate the presence of features or components described in the specification, and do not preclude the presence or addition of one or more other features or components, unless specifically limited.

According to an aspect of the present invention, a composite contains: a carbon support and a binary alloy comprised of platinum (Pt) and an alkaline earth metal supported on the carbon support, wherein in a Pt 4f XPS spectrum of the binary alloy measured by X-ray photoelectron spectroscopy (XPS), E1 and E2 defined by the following Expressions 1 and 2, respectively, satisfy the following Expression 3:

$$E1=E0-E0(\text{ref}) \qquad \text{(Expression 1)}$$

$$E2=EII-EII(\text{ref}) \qquad \text{(Expression 2)}$$

$$E1/E2 \leq 0.85 \qquad \text{(Expression 3)}$$

In Expressions 1 and 2, E0(ref) and EII(ref) are the binding energy (center) of a Pt(0) peak and the binding energy (center) of a Pt(II) peak, respectively, in a Pt 4f XPS spectrum of pure platinum (Pt), and E0 and EII are a binding energy (center) of a Pt(0) peak and a binding energy (center) of a Pt(II) peak, respectively, in the Pt 4f XPS spectrum of the binary alloy.

The composite according to the present invention contains a carbon support and a binary alloy composed of platinum (Pt) and an alkaline earth metal supported on the carbon support, and satisfies a specific condition in the Pt 4f XPS spectrum of the binary alloy measured by X-ray photoelectron spectroscopy (XPS), such that the composite has an excellent catalytic activity, and significantly improved stability and cost effectiveness compared to a pure platinum catalyst according to the related art in an oxygen reduction reaction or a hydrogen evolution reaction.

Specifically, the binary alloy contains a platinum element and an alkaline earth metal element. Since an inexpensive alkaline earth metal is contained in the binary alloy and the amount of platinum actually used may be reduced, a composite containing a binary alloy is advantageous in terms of cost-effectiveness.

In addition, an alloy of platinum and a late transition metal according to the related art is not stable due to the deterioration of a catalyst caused by the migration of alloy components during an electrochemical reaction, for example, an oxygen reduction reaction (ORR) or a hydrogen evolution reaction (HER). On the other hand, the binary alloy contained in the composite according to an exemplary embodiment of the present invention requires a high negative alloying energy to form an alloy, and therefore, dealloying is suppressed and excellent stability may be obtained.

In addition, the durability of the catalyst may be deteriorated due to poisoning of reaction intermediates generated during the electrochemical reaction, but the composite according to an exemplary embodiment of the present invention may effectively suppress a poisoning phenomenon to provide more improved stability.

More specifically, in the composite according to an exemplary embodiment of the present invention, E1 and E2 defined by Expressions 1 and 2, respectively, satisfy Expression 3 in the Pt 4f XPS spectrum of the binary alloy measured by X-ray photoelectron spectroscopy (XPS), such that the poisoning phenomenon caused by the reaction intermediates may be minimized.

In this case, the Pt 4f XPS spectrum may consist of doublet peaks corresponding to Pt $4f_{5/2}$ and Pt $4f_{7/2}$, and the Pt(0) peak and the Pt(II) peak may be peaks deconvoluted from the doublet peaks, respectively. That is, the Pt(0) peak is divided into a Pt(0)-Pt $4f_{5/2}$ peak deconvoluted from a Pt $4f_{5/2}$ peak and a Pt(0)-Pt $4f_{7/2}$ peak deconvoluted from a Pt $4f_{7/2}$ peak, and the peaks are independent of each other.

The Pt(II) peak may also be divided into a Pt(II)-Pt $4f_{5/2}$ peak deconvoluted from the Pt $4f_{5/2}$ peak and a Pt(II)-Pt $4f_{7/2}$ peak deconvoluted from the Pt $4f_{7/2}$ peak, and the peaks are independent of each other.

E1 defined in Expression 1 may be a difference between binding energies located at the centers of the same Pt(0) peaks (Pt(0)-Pt $4f_{5/2}$ or Pt(0)-Pt $4f_{7/2}$) in the XPS spectra of the binary alloy and pure platinum, and E2 defined in Expression 2 may be a difference between binding energies located at the centers of the same Pt(II) peaks (Pt(II)-Pt Pt $4f_{5/2}$ or Pt(II)-Pt $4f_{7/2}$) in the XPS spectra of the binary alloy and pure platinum.

In this case, the binding energies located at the centers of the Pt(0) peak and Pt(II) peak independent of each other in the binary alloy may be higher than the binding energies at the centers of the same Pt(0) peak and Pt(II) peak of the pure platinum.

A shift in binding energy means a shift in a direction in which a d-band center with respect to the Fermi level is lowered, and a change in chemical structure affects the binding strength between platinum atoms located on a surface of the binary alloy and reaction intermediates formed during the catalytic reaction.

As an example, the binding strength between the Pt atoms and the reaction intermediates such as O, OH, and OOH formed during the oxygen reduction reaction or the hydrogen evolution reaction is weakened, such that the poisoning by the reaction intermediates may be minimized, thereby significantly increasing the durability of the catalyst.

As a specific example, E1/E2 in Expression 3 may be 0.85 or less, 0.8 or less, 0.75 or less, 0.70 or less, 0.65 or less, 0.60 or less, or 0.55 or less, and may be substantially 0.3 or more.

In general, as for the activity of the catalyst in the oxygen reduction reaction, molecular oxygen ($O_2$) supplied reacts with hydrogen ions while being adsorbed on the cathode to produce reaction intermediates such as O, OH, and OOH, and finally, to produce $H_2O$.

The reaction intermediates generated in the process of producing $H_2O$, which is the final product, are organically generated (adsorbed) and exhausted (desorbed), and the improvement of the activity of the catalyst due to smooth adsorption and the maintenance of the activity of the catalyst due to ease of the desorption are in a trade-off relationship.

As such, in terms of the activity and the durability of the catalyst that are in a trade-off relationship, in order to have excellent activity and durability of the catalyst in relation to generation (adsorption) and exhaustion (desorption) of the reaction intermediates, it is preferable that E1/E2 in Expression 3 satisfies the above range.

In an exemplary embodiment, the alkaline earth metal contained in the binary alloy may be one or more selected from magnesium (Mg), calcium (Ca), strontium (Sr), barium (Ba), radium (Ra), and beryllium (Be), preferably one or more selected from calcium (Ca), barium (Ba), magnesium (Mg), and strontium (Sr), and more preferably one or more selected from calcium (Ca), magnesium (Mg), and strontium (Sr).

As described above, a binary alloy containing an alkaline earth metal having an oxyphilic property and platinum may suppress dealloying. In particular, the composite of the present invention containing a binary alloy containing calcium and platinum, magnesium and platinum, or strontium and platinum may satisfy Expression 3 (E1/E2≤0.85) in the Pt 4f XPS spectrum, and thus, the composite of the present invention is advantageous in terms of the cost-effectiveness, the catalytic activity, and the stability when applied as a catalyst for an oxygen reduction reaction.

In an exemplary embodiment, the binary alloy may further contain a platinum overlayer formed on a surface thereof.

In this case, the platinum overlayer may mean a case where the intensity of platinum measured from a composition profile of platinum and alkaline earth metal according to a line scan in a high angle annular dark field scanning transmission electron microscopy (HAADF-STEM) image is three times or more compared to the intensity of alkali earth metal.

As an example, the binary alloy may contain a platinum overlayer in which 1 to 10, specifically, 1 to 6, and more specifically, 1 to 3 single atomic layers are stacked based on a single atomic layer composed of platinum atoms, the platinum overlayer being formed on the surface of the binary alloy.

The platinum overlayer formed on the surface of the binary alloy may promote a charge transfer due to a difference in electronegativity between the platinum and the alkaline earth metal to improve the catalytic activity. In addition, strain in a platinum lattice is caused due to a difference in atomic radius between the platinum and the alkaline earth metal, and thus an electron structure is changed compared to pure platinum, such that the durability of the catalyst may be improved.

In an exemplary embodiment, an atomic ratio of the alkaline earth metal to the platinum (Pt) in the binary alloy may be 1:1 to 5, substantially 1:1.6 to 3, and more substantially 1:1.7 to 2.5.

As an exemplary embodiment, the binary alloy may be one or more selected from particulate PtSr, $Pt_2Ca$, $Pt_3Mg$, and $Pt_5Ba$.

In an exemplary embodiment, the binary alloy may have a cubic crystal phase.

As an example, a size of the particle may be 3 to 300 nm, preferably 5 to 200 nm, more preferably 5 to 100 nm, still more preferably 5 to 50 nm, and further still more preferably 5 to 30 nm.

In an exemplary embodiment, as the carbon support contained in the composite, any carbon support may be used without limitation as long as it contains carbon having excellent chemical stability and electrical conductivity known in the art. As an example, the carbon support may be one or more selected from Vulcan carbon, carbon paper, a carbon felt, a carbon fiber, acetylene black, carbon black, Ketjen black, a carbon nanotube, graphene, and TIMCAL, but the present invention is not limited thereto.

As a preferred example, a BET surface area of the carbon support may be 200 $m^2g^{-1}$ or more, 500 $m^2$ $g^{-1}$ or more, 800 $m^2g^{-1}$ or more, 1,000 $m^2$ $g^{-1}$ or more, or 1,200 $m^2g^{-1}$ or more, and an upper limit value thereof is not limited and may be 2,000 $m^2g^{-1}$ or less.

In a case where the carbon support contained in the composite according to an exemplary embodiment of the present invention has a porous structure having a high BET surface area, aggregation of the particulate binary alloy supported on the carbon support is effectively suppressed, which is advantageous in terms of the catalytic activity.

As an exemplary embodiment, a content of the binary alloy supported on the carbon support may be 5 to 50 wt %, substantially 10 to 30 wt %, and more substantially 15 to 25 wt %, with respect to the total weight of the composite.

According to another aspect of the present invention, there is provided a catalyst for an oxygen reduction reaction or a hydrogen evolution reaction (a water electrolysis cell) containing the composite described above.

As described above, the composite containing a carbon support and a binary alloy composed of platinum (Pt) and an alkaline earth metal supported on the carbon support and satisfying a specific condition in a Pt 4f XPS spectrum of the binary alloy measured by X-ray photoelectron spectroscopy (XPS) may be used as a catalyst having excellent activity and significantly excellent stability compared to the pure platinum catalyst according to the related art in an oxygen reduction reaction or a hydrogen evolution reaction.

In addition, the composite is advantageous in terms of the cost-effectiveness because the amount of platinum used may be reduced compared to the pure platinum catalyst.

According to still another aspect of the present invention, there is provided a cathode for a fuel cell or a water electrolysis cell containing the composite described above.

In this case, the cathode may refer to an electrode into which electrons are inserted or in which an oxygen reduction reaction or a hydrogen evolution reaction occurs.

In a fuel cell including an anode that produces hydrogen ions and electrons by oxidation of a fuel material, a cathode in which a reduction of oxygen or another oxidizing agent by a reaction between hydrogen ions and electrons occurs, and in an electrolyte layer (film) that may effectively transfer the hydrogen ions from the anode to the cathode, the cathode described above is applied as the cathode of the fuel cell, such that the efficiency and the stability of the fuel cell may be improved.

According to still another aspect of the present invention, there is provided an energy conversion device that is a fuel cell or a water electrolysis cell including the cathode described above.

Examples of the fuel cell include a polymer electrolyte membrane fuel cell (PEMFC), a direct methanol fuel cell (DMFC) and a direct ethanol fuel cell (DEFC) using alcohol as fuel, an alkaline fuel cell (AFC), a phosphoric acid fuel cell (PAFC), a molten carbonate fuel cell (MCFC), and a solid oxide fuel cell (SOFC), but the present invention is not limited thereto.

As a preferred example, the fuel cell may be a polymer electrolyte membrane fuel cell that is operated at a low temperature and may be applied to a vehicle.

The polymer electrolyte membrane fuel cell is referred to as a proton exchange membrane fuel cell (PEMFC, and may include a first gas diffusion layer, an anode, a polymer electrolyte membrane, a cathode, and a second gas diffusion layer.

In this case, hydrogen, which is a fuel material, is supplied to the anode through the first gas diffusion layer, the supplied hydrogen is oxidized at the anode, hydrogen ions are transferred to the cathode through the polymer electrolyte membrane, and then the hydrogen ions react with oxygen supplied to the cathode through the second gas diffusion layer at the cathode as described above, thereby generating water. At this time, the catalytic activity for the oxygen reduction reaction is improved due to the composite according to the present invention contained in the cathode, such that the stability of the fuel cell may be improved by the composite having significantly excellent durability.

The fuel material, air, or oxygen may be smoothly supplied to the first gas diffusion layer and the second gas diffusion layer, and the first gas diffusion layer and the second gas diffusion layer may be formed of a material having electrical conductivity known in the art, but the present invention is not limited thereto.

The polymer electrolyte membrane is applied to the fuel cell field and may be applied without limitation as long as it is formed of a polymer material known in the art. Examples of the polymer material include, but are not limited to, a sulfonated benzimidazole-based polymer, a sulfonated polyimide-based polymer, a sulfonated polyetherimide-based polymer, a sulfonated polyphenylenesulfide-based polymer, a sulfonated polysulfone-based polymer, a sulfonated polyether-based polymer, a sulfonated polyetherketone-based polymer, a sulfonated polyether-etherketone-based polymer, a sulfonated polyethersulfone-based polymer, a sulfonated polyphenylquinoxaline-based polymer, and a polymer into which a sulfonated partial fluorine-based polymer is introduced.

According to still another aspect of the present invention, there is provided a method of producing the composite described above.

A method of producing the composite according to an exemplary embodiment of the present invention includes: a step a) of preparing a mixture containing a platinum precursor, an alkaline earth metal precursor, a first reducing agent, and an aprotic organic solvent; a step b) of preparing a colloid containing a synthetic product by performing a first heat treatment on the mixture at a temperature equal to or higher than a boiling point of the organic solvent and then naturally cooling the mixture; a step c) of obtaining the synthetic product by centrifuging the colloid; a step d) of applying the synthetic product onto a carbon support, mixing the synthetic product with a powdery second reducing agent, and then performing a second heat treatment in an inert reducing atmosphere to induce alloying between platinum and an alkaline earth metal; and a step e) of removing impurities included in the alloyed synthetic product through an acid treatment.

In the method of producing the composite according to the present invention, simple processes such as a solvothermal synthesis method and a heat treatment are used to provide a composite containing a synthetic product obtained by alloying platinum and an alkaline earth metal.

Hereinafter, a method of producing the composite provided according to another aspect of the present invention will be described in detail for each step.

The method of producing the composite according to an exemplary embodiment may include a step of preparing a mixture containing a platinum precursor, an alkaline earth metal precursor, a first reducing agent, and an aprotic organic solvent.

As an exemplary embodiment, a molar ratio of the platinum precursor to the alkaline earth metal precursor in the mixture may be 1:2 to 10, specifically, 1:2 to 8, and more specifically, 1:3 to 6.

In the entire metal precursor containing platinum and an alkaline earth metal contained in the mixture, a molar ratio of the metal precursor to the first reducing agent may be 1:5 to 25, preferably 1:5 to 20, and more preferably 1:8 to 15.

In order to efficiently alloy the platinum and the alkaline earth metal through a first heat treatment and a second heat treatment to be described below, it is preferable that the molar ratio of the platinum precursor to the alkaline earth metal precursor and the molar ratio of the metal precursor to the first reducing agent satisfy the above ranges.

In an exemplary embodiment, the platinum precursor may be platinum chloride, and as a specific example, the platinum precursor may be one or more selected from $PtCl_2$, $PtCl_4$, $H_2PtCl_6$, $K_2(PtCl_4)$, $[Pt(NH_3)_4]Cl_2$, and $(NH_3)_2PtCl_6$.

The alkaline earth metal precursor may be chloride containing one or more metals selected from magnesium (Mg), calcium (Ca), strontium (Sr), barium (Ba), radium (Ra), and beryllium (Be), and specifically, may be one or more selected from calcium chloride ($CaCl_2$), strontium chloride ($SrCl_2$), and magnesium chloride ($MgCl_2$).

In a specific example, the first reducing agent may be one or more selected from sodium hydride (NaH), sodium borohydride ($NaBH_4$), lithium tetrahydroaluminate ($LiAlH_4$), hydrazine ($N_2H_4$), diisobutylaluminum hydride (DIBALH), and potassium triethylborohydride ($KEt_3BH$).

In this case, it is preferable that the first reducing agent is easily dissolved in an aprotic organic solvent to be described below and reduces metal ions included in the metal precursor with a strong reducing power. In this respect, the first reducing agent may be sodium borohydride ($NaBH_4$) as a preferred example.

In the step of preparing the mixture, the platinum precursor, the alkaline earth metal precursor, and the first reducing agent are dissolved in an aprotic organic solvent, such that oxidation of the reduced alkaline earth metal may be effectively suppressed, thereby improving the alloying efficiency between the platinum and the alkaline earth metal.

As an exemplary embodiment, a content of the aprotic organic solvent contained in the mixture may be 60 to 99 wt %, substantially 70 to 99 wt %, and more substantially 80 to 99 wt %, with respect to the total weight of the mixture.

In a specific example, the aprotic organic solvent may be one or more selected from acetonitrile, dimethylacetamide (DMAc), dimethylformamide (DMF), dimethyl sulfoxide (DMSO), methyl ethyl ketone, methyl n-propyl ketone, N-methylpyrrolidone (NMP), propylene carbonate, nitromethane, sulfolane, and hexamethylphosphoramide (HMP), and preferably may be dimethylformamide (DMF).

In this case, the aprotic organic solvent may be degassed to remove dissolved oxygen in the organic solvent.

As a specific example, the step of preparing the mixture containing the platinum precursor, the alkaline earth metal precursor, the first reducing agent, and the aprotic organic solvent may be performed under anhydrous and anoxic conditions.

As a specific example, the step of preparing the mixture may be performed in an inert glove box filled with argon gas, and any method may be used without limitation as long as it may satisfy anhydrous and anoxic conditions. As such, the mixture is prepared under anhydrous and anoxic conditions, such that the alloying efficiency between the platinum and the alkaline earth metal may be improved.

As an exemplary embodiment, a colloid containing a synthetic product may be prepared by performing a first heat treatment on the prepared mixture and then naturally cooling the mixture to room temperature (15 to 25° C.)

In this case, the first heat treatment may be performed in a vacuum autoclave in order to improve the alloying efficiency between the platinum and the alkaline earth metal. That is, the step of preparing the colloid containing the synthetic product may be performed under anhydrous and anoxic conditions in the same manner as in the step of preparing the mixture.

As a specific example, the temperature in the first heat treatment may be a temperature equal to or higher than the boiling point of the aprotic organic solvent, and specifically, may be, for example, 50 to 300° C., preferably 80 to 250° C., and more preferably 100 to 200° C.

As an example, the first heat treatment may be performed for 11 to 40 hours, substantially 11 to 30 hours, and more substantially 11 to 25 hours.

A synthetic product containing crystalline platinum and an amorphous alkali earth metal may be prepared by the heat treatment conditions, that is, the temperature in the first heat treatment and solvothermal synthesis over time.

When the duration of the first heat treatment is shorter than 11 hours under the first heat treatment temperature condition, after a second heat treatment to be described below, alloying between the platinum and the alkaline earth metal may not be performed or the alloying efficiency between the platinum and the alkaline earth metal may be reduced. When the duration of the first heat treatment exceeds 40 hours, the particle size of the alloy obtained by alloying the platinum and the alkaline earth metal prepared after a second heat treatment to be described below is increased, which may cause a reduction in catalytic activity. Therefore, in the step of preparing the colloid containing the synthetic product, it is preferable to satisfy the first heat treatment conditions described above.

In an exemplary embodiment, a step of obtaining the synthetic product by centrifuging the colloid containing the synthetic product may be performed, and then, a step of applying the synthetic product onto a carbon support, mixing the synthetic product with a powdery second reducing agent, and then performing a second heat treatment in an inert reducing atmosphere to induce alloying between platinum and an alkaline earth metal may be performed.

As an exemplary embodiment, the second reducing agent mixed with the obtained synthetic product may be contained in an amount of 20 to 90 wt %, specifically, 40 to 80 wt %, and more specifically, 50 to 70 wt %, with respect to the total weight of the mixture of the synthetic product and the second reducing agent, in terms of weight ratio.

In this case, the second reducing agent may be one or more selected from sodium hydride (NaH), sodium borohydride (NaBH$_4$), lithium tetrahydroaluminate (LiAlH$_4$), hydrazine (N$_2$H$_4$), diisobutylaluminum hydride (DIBALH), and potassium triethylborohydride (KEt$_3$BH), and may be the same as or different from the first reducing agent described above. As a preferred example, the second reducing agent may be potassium triethylborohydride (KEt$_3$BH).

In this case, the second reducing agent may have a stronger reducing power than the first reducing agent. The second reducing agent, which is a stronger reducing agent than the first reducing agent, is mixed with the obtained synthetic product, and then, a second heat treatment is performed on the mixture in an inert reducing atmosphere, such that the reduction efficiency of the alkaline earth metal contained in the synthetic product may be further improved, thereby improving the alloying efficiency between the platinum and the alkaline earth metal.

As an exemplary embodiment, the second heat treatment for inducing alloying between the platinum and the alkaline earth metal may be performed by mixing the second reducing agent and the synthetic product, and then additionally mixing the carbon support or applying the carbon support onto the carbon support.

In this case, physical properties of a final product obtained through the second heat treatment, that is, a composite, may be the same as or similar to the physical properties of the composite produced after induction of the alloying described above.

That is, in order to induce alloying between the platinum and the alkaline earth metal, the mixing order of the synthetic product obtained by centrifugation before performing the second heat treatment, the carbon support, and the second reducing agent may be freely adjusted. In this case, the carbon support may be the same as the carbon support described above, and a detailed description thereof will be omitted.

As an example, a method of applying the synthetic product or the synthetic product mixed with the second reducing agent onto the carbon support, a spray coating method, a tape casting method, a powder spraying device, or the like may be used, but the present invention is not limited thereto.

As an exemplary embodiment, a process of mixing the obtained synthetic product with the carbon support and mixing with the second reducing agent or a process of mixing the obtained synthetic product with the second reducing agent and a process of applying the resulting mixture onto the carbon support or mixing the resulting mixture with the carbon support may all be performed under anhydrous and anoxic conditions.

In an exemplary embodiment, the synthetic product mixed with the carbon support or mixed with the second reducing agent applied onto the carbon support may induce alloying between the platinum and the alkaline earth metal through the second heat treatment in an inert reducing atmosphere.

The inert reducing atmosphere may be an atmosphere containing an inert gas containing hydrogen, and the inert gas may be helium, argon, neon gas, or the like, but is not limited thereto.

In this case, the amount of the hydrogen contained in the inert gas may be 1 to 10 vol %, and specifically, 3 to 8 vol %.

In an exemplary embodiment, the temperature in the second heat treatment for alloying between the platinum and the alkaline earth metal may be 300 to 1,000° C., substantially 600 to 1,000° C., and more substantially 800 to 1,000° C.

As an exemplary embodiment, the second heat treatment may be performed for 2 to 10 hours, and substantially, 2 to 6 hours.

In order to induce alloying between the platinum and the alkaline earth metal with excellent alloying efficiency, it is preferable that the temperature and duration of the second heat treatment satisfy the above ranges.

In an exemplary embodiment, the alloyed synthetic product is subjected to an acid treatment, such that impurities included in the alloyed synthetic product may be removed.

The acid treatment may be performed by impregnating the alloyed synthetic product using an acid solution at a temperature of 40 to 100° C., and substantially 60 to 80° C., for 2 to 10 hours, and preferably 4 to 6 hours.

In this case, the acid solution may be a solution containing hydrochloric acid, sulfuric acid, phosphoric acid, and nitric acid, and a concentration of the acid solution may be 0.05 to 5 M, specifically, 0.1 to 3 M, and more specifically, 0.5 to 1.5 M, for effective removal of the impurities.

In an exemplary embodiment, a platinum overlayer may be formed on a surface of the alloyed synthetic product by the acid treatment described above.

In this case, the platinum overlayer may be formed by removing a thermodynamically unstable alkaline earth metal from the surface of the alloy of the platinum and the alkaline earth metal in the acid treatment.

After the acid treatment, the alloy of the platinum and the alkaline earth metal from which impurities are removed may be particulate $Pt_2Ca$.

After the acid treatment, the particulate alloy of the platinum and the alkaline earth metal may be obtained as a composite supported on the carbon support, and a weight of the alloy supported on the carbon support may be 5 to 80 wt %, substantially 10 to 40 wt %, and more substantially 15 to 25 wt %, with respect to the total weight of the composite, depending on the conditions of use.

As described above, the composite produced by the production method described above, that is, the composite containing the carbon support and the binary alloy supported on the carbon support and containing the platinum and the alkaline earth metal may be used as a catalyst having excellent activity and significantly excellent stability compared to the pure platinum catalyst according to the related art in an oxygen reduction reaction or a hydrogen evolution reaction because the binary alloy contained in the composite satisfies the specific condition in the Pt 4f XPS spectrum described above.

Hereinafter, the composite according to the present invention will be described in more detail with reference to Examples. However, the following Examples are only reference examples for describing the present invention in detail, and the present invention is not limited thereto and may be implemented in various forms.

In addition, unless otherwise defined, all technical terms and scientific terms used herein have the same meanings as commonly understood by those skilled in the art to which the present invention pertains. The terms used for the description herein are only intended to effectively describe a certain Example and are not intended to limit the present invention.

Example 1

Platinum(IV) chloride ($PtCl_4$), calcium chloride ($CaCl_2$), and sodium borohydride ($NaBH_4$) were dissolved at a molar ratio of 1:4.5:62.6 in a 15 mL degassed N,N'-dimethylformamide solvent contained in a vial in an inert glove box, and the vial was sealed with a Teflon tape and then sonicated for 2 hours, thereby preparing a mixture.

The prepared mixture was subjected to a first heat treatment in a 25 mL Teflon-lined autoclave at a temperature of 165° C. for 12 hours and then naturally cooled to room temperature to prepare a colloid containing a synthetic product, and then the synthetic product was obtained by centrifugation.

In an inert glove box, the obtained synthetic product was applied on 80 mg of commercial carbon (Ketjen Black EC 600JD) and then mixed with 80 mg of powdered potassium triethylborohydride ($KEt_3BH$). Thereafter, a second heat treatment was performed in an inert reducing atmosphere (5% $H_2$/Ar) at a temperature of 900° C. for 4 hours to induce alloying, an acid treatment was performed using a 1.0 M hydrochloric acid solution at a temperature of 70° C. for 5 hours to remove impurities, and then drying was performed, thereby producing a composite (PtCa/C) containing a platinum-based alloy supported on carbon. At this time, the content of the metal contained in the composite was 20.41 wt %.

A schematic view of a process of producing the composite (PtCa/C) containing the platinum-based alloy supported on carbon is illustrated in FIG. 1.

Example 2

A process was performed in the same manner as that of Example 1 except for performing the first heat treatment for 24 hours.

Example 3

A process was performed in the same manner as that of Example 1 except for applying the synthetic product obtained after the first heat treatment on Vulcan carbon (Vulcan XC72) having a small surface area of about 300 to 400 m²/g instead of on commercial carbon (Ketjen Black EC 600JD) having a large surface area of about 1,400 m²/g.

Example 4

A process was performed in the same manner as that of Example 1 except for using strontium chloride ($SrCl_2$) instead of calcium chloride ($CaCl_2$) to prepare a mixture.

Example 5

A process was performed in the same manner as that of Example 1 except for using barium chloride ($BaCl_2$) instead of calcium chloride ($CaCl_2$) to prepare a mixture.

Example 6

A process was performed in the same manner as that of Example 1 except for using magnesium chloride ($MgCl_2$) instead of calcium chloride ($CaCl_2$) to prepare a mixture.

Comparative Example 1

A process was performed in the same manner as that of Example 1 except for performing the first heat treatment for 10 hours.

Comparative Example 2

A Pt solution (100 mg/ml) and 80 mg of commercial carbon (Ketjen Black EC 600JD) were dispersed in water to prepare a mixture. At this time, a content of platinum was 20 wt % with respect to the total weight of platinum and carbon (20 Wt % Pt/C).

The prepared mixture was sonicated for 30 minutes and then heated under magnetic stirring conditions to evaporate water until a thick slurry was formed, and then the slurry was dried in a vacuum oven at 70° C. for 4 hours. 13 mg of metal Ca particles (Alfa Aesar Korea) were mixed with 20 wt % of dried Pt/C, and then the mixture was pulverized in a mortar, thereby preparing a mixed powder.

Subsequently, the final powdered mixture was placed in a tube furnace, and the mixture was subjected to a heat treatment in an inert reducing atmosphere (5% $H_2$/Ar) at a temperature of 900° C. for 5 hours and then dried.

Comparative Example 3

Commercially available Pt/C (20 wt % Pt, Tanaka Kikin-zoku Kogyo, Japan) was purchased.

(Experimental Example 1) Morphological and Structural Properties

The morphological and structural properties of the prepared platinum-based alloy were observed using a transmission electron microscope (TEM, Hitachi HF-3300), a high-resolution transmission electron microscope (HR-TEM), and an X-ray diffractometer (XRD, Rigaku Smartlab, 40 kV, 30 mA, 4° $min^{-1}$, Cu—Kα radiation, λ=0.15406 nm).

Figure 2:
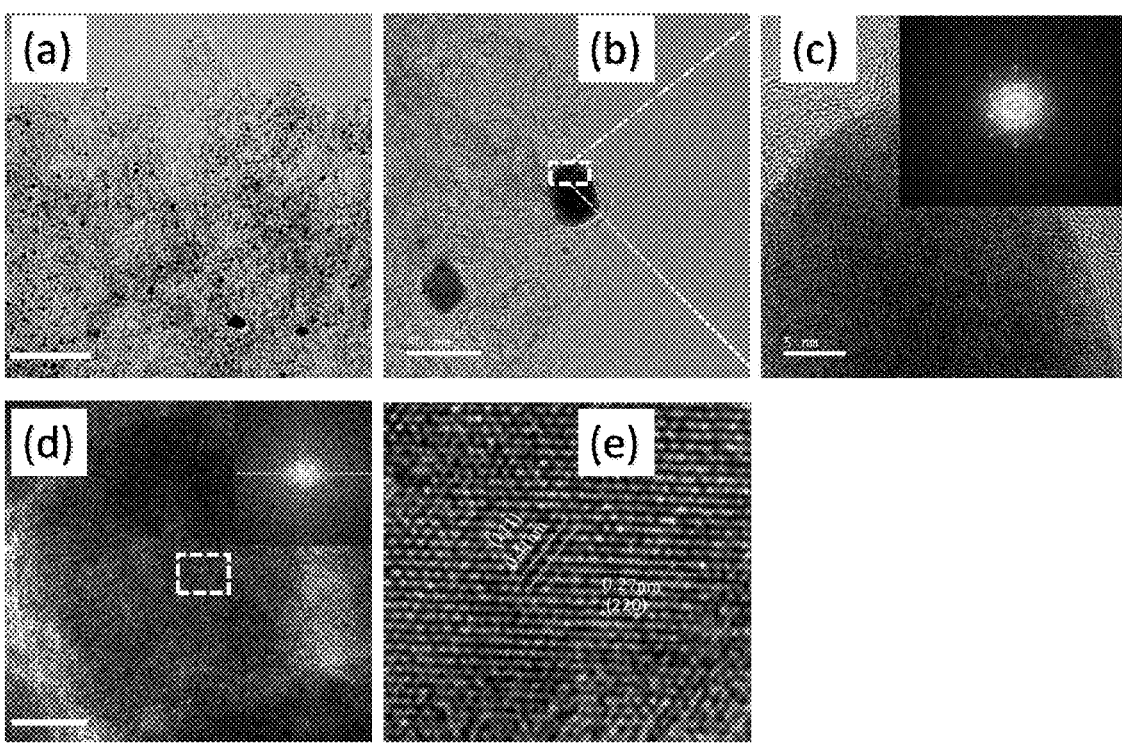
FIGS. 2A and 2B are views illustrating transmission electron microscopy (TEM) images of Example 1 at a low magnification (scale bar: 100 nm) and a high magnification (scale bar: 50 nm), respectively.
FIG. 2C is a view illustrating a high-resolution (HR)-TEM image and a Fast Fourier Transform (FFT) pattern image corresponding to the portion indicated by the dotted line in FIG. 2B.
FIG. 2D is a view illustrating an HR-TEM image of a platinum-based alloy portion of Example 1 (scale bar: 5 nm)
FIG. 2E is a view illustrating an enlarged image of the portion indicated by the dotted line in FIG. 2D.

FIGS. 2A and 2B are views illustrating TEM images of PtCa/C of Example 1 at a low magnification (scale bar: 100 nm) and a high magnification (scale bar: 50 nm), respectively, FIG. 2C is a view illustrating an HR-TEM image and a Fast Fourier Transform (FFT) pattern image corresponding to the portion indicated by the dotted line in FIG. 2B, FIG. 2D is a view illustrating an HR-TEM image of a platinum-based alloy portion of Example 1 (scale bar: 5 nm), and FIG. 2E is a view illustrating an enlarged image of the portion indicated by the dotted line in FIG. 2D.

As illustrated in FIGS. 2A and 2B, it could be seen that nanoparticles having a size of 10 to 25 nm were uniformly dispersed on the carbon support (commercial carbon, Ketjen Black EC 600JD). Although not illustrated, in the case of Example 3 in which Vulcan carbon having a small surface area was applied as a carbon support, nanoparticles having a size of 50 to 200 nm were observed, which was considered to be due to aggregation between the particles during the second heat treatment.

That is, it was confirmed that aggregation between the particles was effectively suppressed on the carbon support having a large surface area during the second heat treatment performed at a high temperature.

Furthermore, it was confirmed from FIGS. 2C to 2E that the nanoparticles uniformly dispersed on the carbon support had high crystallinity, and as illustrated in FIG. 2E, from the fact that the nanoparticles had a lattice spacing of 0.41 nm on a (111) plane, which was increased compared to a lattice spacing (0.23 nm) on a (111) plane of Pt, it could be appreciated that Ca was incorporated into the Pt lattice, and the lattice spacing on the (111) plane of the nanoparticles was significantly similar to a lattice spacing (0.44 nm) of a (111) plane of $Pt_2Ca$. In addition, a lattice spacing (0.27 nm) of a (220) plane of the nanoparticles was also significantly similar to a lattice spacing (0.269 nm) of a (220) plane of $Pt_2Ca$.

Figure 3:
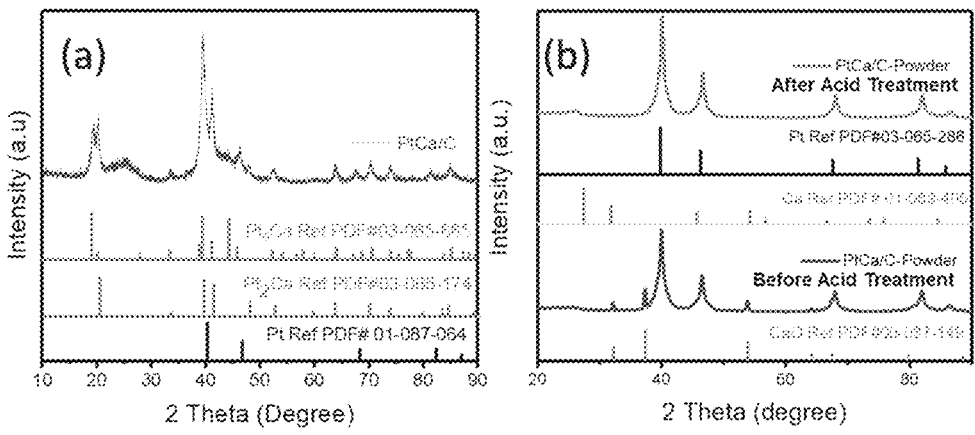
FIGS. 3A and 3B are views illustrating X-ray diffraction (XRD) patterns of Example 1 and respectively.

FIGS. 3A and 3B are views illustrating X-ray diffraction (XRD) patterns of Example 1 and Comparative Example 2, respectively. In this case, in FIG. 3B, the XRD pattern on the top was measured after the acid treatment, and the XRD pattern on the bottom was measured before the acid treatment.

Referring to FIG. 3A, in Example 1, it could be seen that peaks at 2θ values of 20.14, 33.19, 39.13, 40.95, 47.64, 52.22, 63.29, and 69.66 appeared and were matched with specific peak (PDF # 030651744) data on (111), (220), (311), (222), (400), (331), (511), and (440) planes of the $Pt_2Ca$ alloy, respectively, and in addition, it was confirmed that it was consistent with the result indicating that the nanoparticles were alloys similar to $Pt_2Ca$ based on the lattice spacing on the HR-TEM image. It could be seen that such a crystallographic structure was consistent with a cubic structure of a space group Fd-3m (#227).

In addition, from the peak having a high intensity at the 2θ value of 39.13 and the peaks of pure Pt corresponding to (200), (220), and (222) planes observed in the XRD pattern of Example 1, it could be seen that the $Pt_2Ca$ alloy and Pt were present in a mixed phase.

On the other hand, as illustrated in FIG. 3B, in Comparative Example 2, after the acid treatment, no peak corresponding to significant $Pt_2Ca$ was observed, except for the peak corresponding to the pure Pt XRD pattern. From this result, it was determined that, even when an alloy was formed, the amount of alloy formed was significantly small. In addition, although not illustrated, in the case of Comparative Example 1, an alloying rate was significantly low, and a significant XRD pattern corresponding to $Pt_2Ca$ was not observed.

Figure 4:
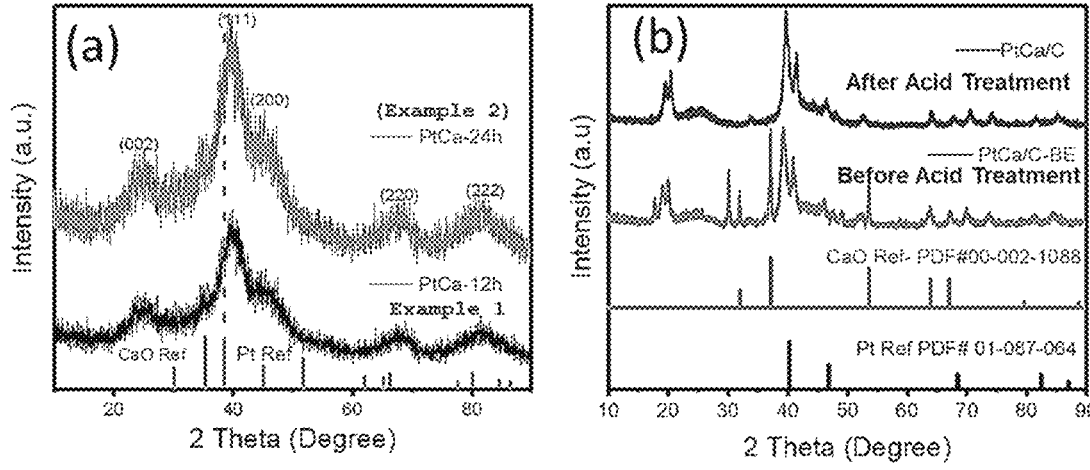
FIG. 4A is a view illustrating XRD patterns of Example 1 (bottom of FIG. 4A) and Example 2 (top of FIG. 4A)
FIG. 4B is a view illustrating XRD patterns of Example 1 when measured before and after an acid treatment.

FIG. 4A is a view illustrating XRD patterns of Example 1 (bottom of FIG. 4A) and Example 2 (top of FIG. 4A) before a second heat treatment, and FIG. 4B is a view illustrating XRD patterns of Example 1 when measured before and after an acid treatment.

Referring to FIG. 4A, in Example 1 in which, before the second heat treatment, that is, the first heat treatment was performed at a temperature of 165° C. for 12 hours and Example 2 in which the first heat treatment was performed for 24 hours, the peaks corresponding to the (111), (200), (220), and (222) planes of pure Pt were observed, the position of the (111) peak was observed at a position shifted to a higher 2θ value that in the case of pure Pt(2θ=39.76), and a crystalline peak corresponding to calcium chloride or calcium was not observed.

From this result, it could be appreciated that crystalline Pt was formed through the first heat treatment and Ca was present in a form of an amorphous phase or doped on a crystalline Pt phase. In addition, as illustrated in FIG. 4A, Ca was present in a form of oxide (CaO) and was also present in a form of $CaH_2$ through hydrogenation. From this, it could be seen that the position of the (111) peak described above was located at a 2θ value positively shifted compared to pure Pt.

In particular, since CaO formed during the first heat treatment may protect crystalline Pt formed in advance during the second heat treatment performed at a high temperature (900° C.) to suppress aggregation of particles, an active area of the platinum-based alloy catalyst (PtCa/C) may be expanded, which is preferable.

FIG. 4B illustrates the result of comparing the XRD patterns before and after the acid treatment after the second heat treatment in Example 1. It could be seen that calcium hydroxide ($Ca(OH)_2$) formed during the second heat treatment was completely removed through the acid treatment, and as described above, the reason why the $Pt_2Ca$ alloy and Pt were present in a mixed phase after the acid treatment was because Ca, which was located on the surface of the platinum-based alloy catalyst and was thermodynamically unstable, was removed during the acid treatment and thus a Pt overlayer was formed.

Figure 5:
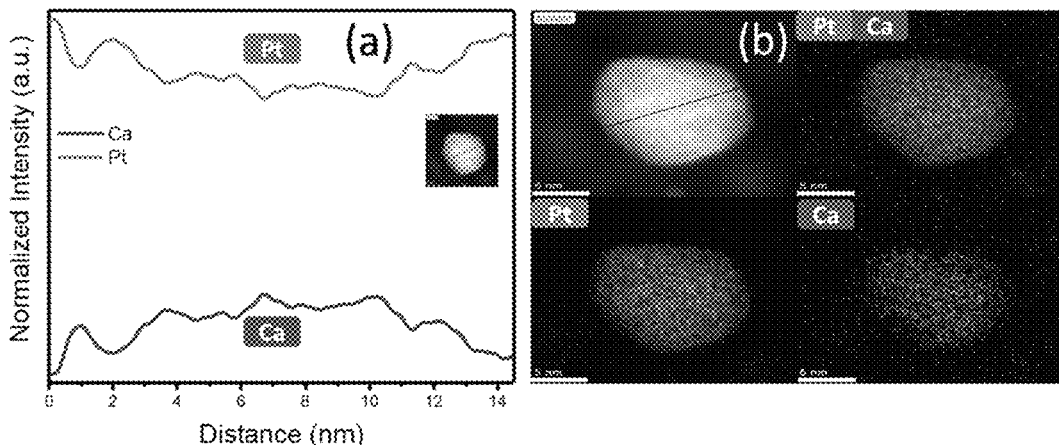
FIGS. 5A and 5B are views illustrating composition profiles of Pt and Ca according to a line scan in a high angle annular dark field scanning transmission electron microscopy (HAADF-STEM) image and an energy dispersive X-ray spectroscopy (EDS) elemental mapping image of one platinum-based alloy particle obtained using EDS of Example 1, respectively.

FIGS. 5A and 5B are views illustrating composition profiles of Pt and Ca according to a line scan in a high angle annular dark field scanning transmission electron microscopy (HAADF-STEM) image and an energy dispersive X-ray spectroscopy (EDS) elemental mapping image of one platinum-based alloy particle obtained using EDS of Example 1, respectively.

As illustrated in FIGS. 5A and 5B, it could be seen that the Pt overlayer was formed and Pt and Ca elements were uniformly dispersed throughout the platinum-based alloy particles, and in particular, in FIG. 5B, it was confirmed that the area of the region where the Pt element was present was larger than the area of the Ca element region and the Ca element was concentrated and distributed at the center of the particle.

In addition, it was confirmed that atomic percentages of Pt and Ca observed from the EDS spectrum in Example 1 were 65.8% and 32.2%, respectively. It could be appreciated that this is the same result as the result that the platinum-based alloy confirmed by the XRD analysis was consistent with the XRD pattern data of the $Pt_2Ca$ alloy.

(Experimental Example 2) Chemical and Electron Structure Properties

The chemical and electron structure of the prepared platinum-based alloy catalyst was analyzed through X-ray photoelectron spectroscopy (XPS).

Figure 6:
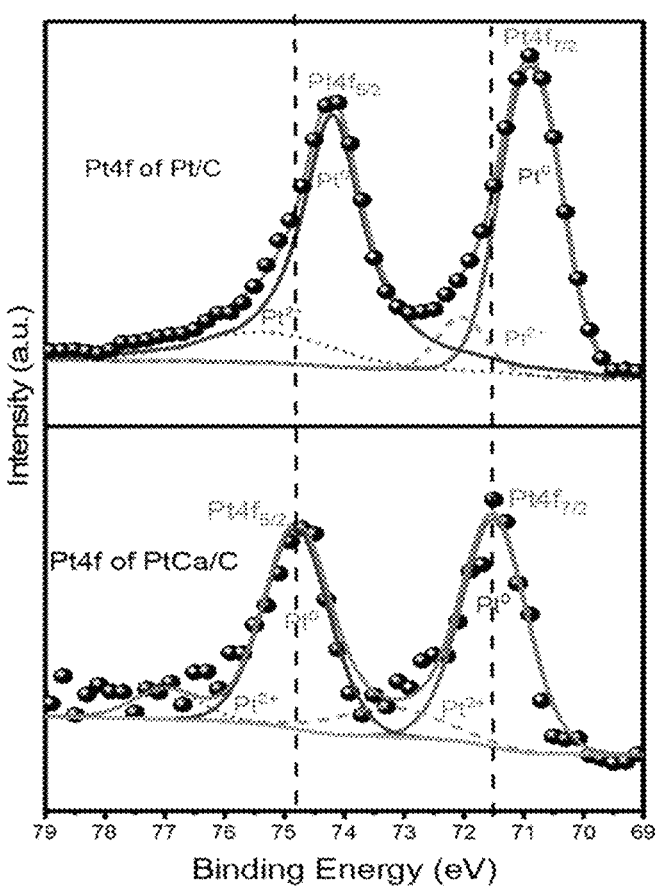
FIGS. 6A and 6B are views illustrating high-resolution Pt 4f XPS profiles of Comparative Example 3 and Example 1, respectively.

FIGS. 6A and 6B are views illustrating high-resolution Pt 4f XPS profiles of Comparative Example 3 (commercial Pt/C) and Example 1 (PtCa/C), respectively.

As illustrated in FIGS. 6A and 6B, it could be seen that all the Pt 4f XPS spectra of Example 1 and Comparative Example 3 consisted of doublet peaks corresponding to Pt $4f_{5/2}$ and Pt $4f_{7/2}$. In addition, it could be seen that the doublet peaks corresponding to Pt $4f_{5/2}$ and Pt $4f_{7/2}$ were composed of deconvoluted Pt(0) and Pt(II) peaks, respectively.

It was observed that a binding energy at which the doublet peak of Example 1 (including the deconvoluted Pt(0) and Pt(II) peaks) was located, was shifted in a positive direction, that is, to a higher binding energy compared to a binding energy at which the doublet peak of Comparative Example 3 (including the deconvoluted Pt(0) and Pt(II) peaks) was located.

Specifically, it was confirmed that the binding energies of the Pt(0) peaks deconvoluted from the Pt $4f_{5/2}$ and Pt $4f_{7/2}$ peaks of Example 1 were 74.8 eV and 71.5 eV, respectively, the binding energies of the Pt(0) peaks deconvoluted from the Pt $4f_{5/2}$ and Pt $4f_{7/2}$ peaks of Comparative Example 3 were 74.2 eV and 70.9 eV, respectively, and all the Pt(0) peaks deconvoluted from the Pt $4f_{5/2}$ and Pt $4f_{7/2}$ peaks were located at higher binding energies in Example 1 than in Comparative Example 3 by 0.6 eV.

It was confirmed that the binding energies of the Pt(II) peaks deconvoluted from the Pt $4f_{5/2}$ and Pt $4f_{7/2}$ peaks were 76.9 eV and 73.2 eV, respectively, in Example 1, and 75.3 eV and 72.1 eV, respectively, in Comparative Example 3. It was confirmed that the Pt(II) peaks deconvoluted from the Pt $4f_{5/2}$ and Pt $4f_{7/2}$ peaks were located at higher binding energies in Example 1 than in Comparative Example 3 by 1.6 eV and 1.1 eV, respectively.

At this time, it was established that, based on the binding energies of the deconvoluted Pt(0) and Pt(II) peaks corresponding to the doublet peaks of Pt $4f_{5/2}$ and Pt $4f_{7/2}$, respectively, in the XPS spectrum of commercial Pt/C, a difference between the binding energies of the deconvoluted Pt(0) and Pt(II) peaks corresponding to the doublet peaks of Pt $4f_{5/2}$ and Pt $4f_{7/2}$, respectively, in the XPS spectrum of PtCa/C (Example 1), that is, a ratio (E1/E2) of a difference (E1) between the binding energies at the Pt(0) peaks to a difference (E2) between the binding energies at the Pt(II) peaks, was 0.37 at the Pt $4f_{5/2}$ peak and 0.54 at the Pt $4f_{7/2}$ peak.

A shift in binding energy means a shift in a direction in which a d-band center with respect to the Fermi level is lowered, and a change in chemical structure affects the binding strength between Pt atoms located on a surface of the platinum-based alloy catalyst (PtCa/C) and reaction intermediates formed by the catalytic reaction.

As an example, the binding strength between the Pt atoms and the reaction intermediates such as OH and —OOH formed during the oxygen reduction reaction (ORR) is weakened, such that the poisoning of the platinum-based catalyst by the reaction intermediates may be minimized, thereby significantly increasing the durability.

(Experimental Example 3) Analysis of Electrochemical Properties

In order to analyze the electrocatalyst properties for the oxygen reduction reaction, the electrochemical properties of each sample were measured in a 0.1 M $HClP_4$ solution using glassy carbon coated with the composites of Example 1 and Comparative Example 3 as a working electrode, a Pt wire as a counter electrode, and a rotating disk electrode using a three-electrode system composed of silver/silver chloride (Ag/AgCl) as a reference electrode in a 1.0 M potassium chloride (KCl) solution.

At this time, a catalyst ink in which 2.5 mg of the catalyst powder prepared according to each of Example 1 and Comparative Example 3 was dispersed in a mixed solution in which 4 mL of deionized water, 0.95 mL of isopropanol, and 0.5 mL of a 5 wt % Nafion solution were mixed by an ultrasonic treatment was prepared, 1.5 μL of the catalyst ink was drop-casted on glassy carbon and then dried, thereby preparing a working electrode loaded with 5 $\mu g_{Pt}/cm^2$ of a catalyst.

The characteristics of the oxygen reduction reaction (ORR) were measured under conditions of a scan rate of 10 mV/s and a working electrode rotating speed of 1,600 rpm.

Figure 7:
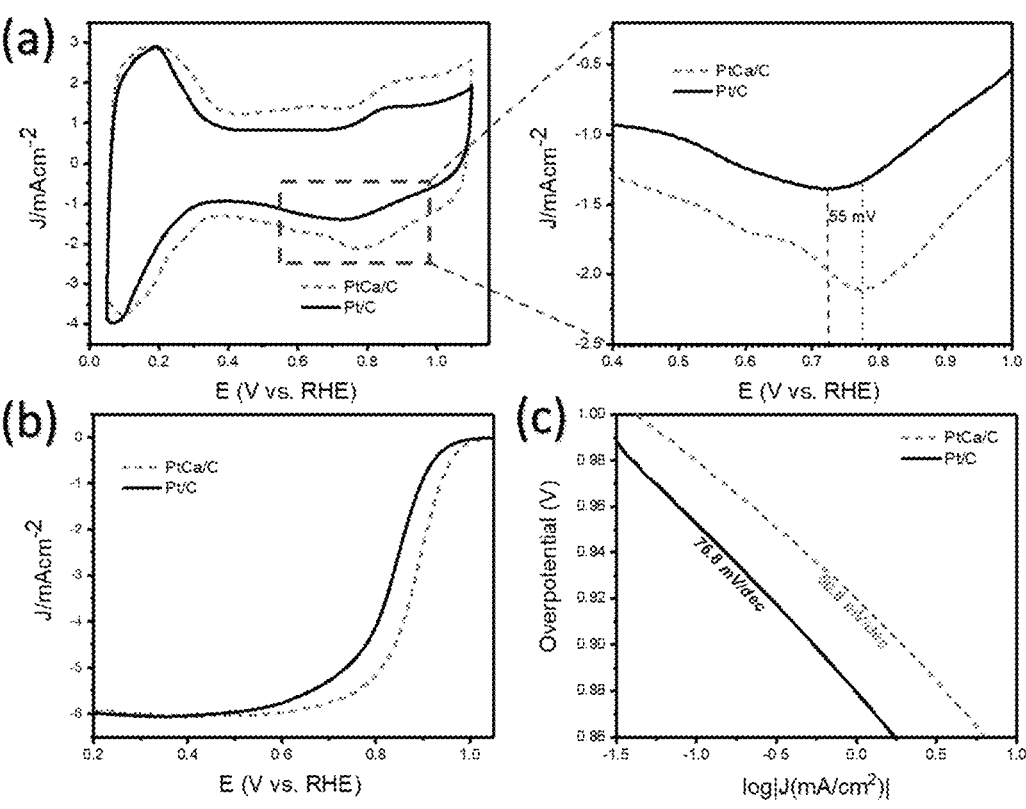
FIGS. 7A, 7B, and 7C are views illustrating a cyclic voltammogram (CV) curve measured in a nitrogen-saturated 0.1 M HClO$_4$ solution, an oxygen reduction reaction (ORR) polarization curve measured by linear sweep voltammetry (LSV) in an oxygen-saturated 0.1 M HClO$_4$ solution, and a Tafel plot of Example 1 and Comparative Example 3, respectively.

FIGS. 7A, 7B, and 7C are views illustrating a cyclic voltammogram (CV) curve measured in a nitrogen-saturated 0.1 M $HClO_4$ solution, an oxygen reduction reaction (ORR) polarization curve measured by linear sweep voltammetry (LSV) in an oxygen-saturated 0.1 M $HClO_4$ solution, and a Tafel plot of Example 1 and Comparative Example 3, respectively.

As illustrated in FIG. 7A, it could be confirmed that in the case of Example 1 (PtCa/C), the oxide and hydroxide adsorption peaks were shifted in a positive voltage direction compared to Comparative Example 3 (commercial Pt/C), which occurred because, as described above, the adsorption peaks were shifted in a direction in which the center of the d-band of Pt was lowered due to the alloy of Pt and Ca formed in Example 1 and the binding strength of Pt—O was weakened as a result. Similarly, referring to the enlarged view in the range of 0.4 to 1.0 V in FIG. 7A, it was observed that the reduction peak of Example 1 was shifted in the positive voltage direction compared to Comparative Example 3, and in particular, it could be seen that the overpotential of Example 1 was decreased by about 55 mV compared to Comparative Example 3. Therefore, it was confirmed that the catalytic activity of Example 1 was superior to that of Comparative Example 3.

An example of another index indicating the catalytic activity includes a half-wave potential in the ORR polarization curve obtained by the linear sweep voltammetry. The half-wave potential is a potential when the current reaches half the diffusion limiting current density. The higher the half-wave potential value, the better the catalytic activity. Referring to the ORR polarization curve of FIG. 7B, it could be seen that the half-wave potential of Example 1 was 0.87 V, which was higher than that of Comparative Example 3 (0.835 V) by 35 mV.

In addition, referring to the Tafel slope in the Tafel plot of FIG. 7C, it could be seen that the Tafel slope of Example 1 was 60.8 mV/dec, which was lower than that of Comparative Example 3 (76.8 mV/dec). Therefore, it could be appreciated that the activation reaction rate of Example 1 was superior to that of Comparative Example 3.

Figure 8:
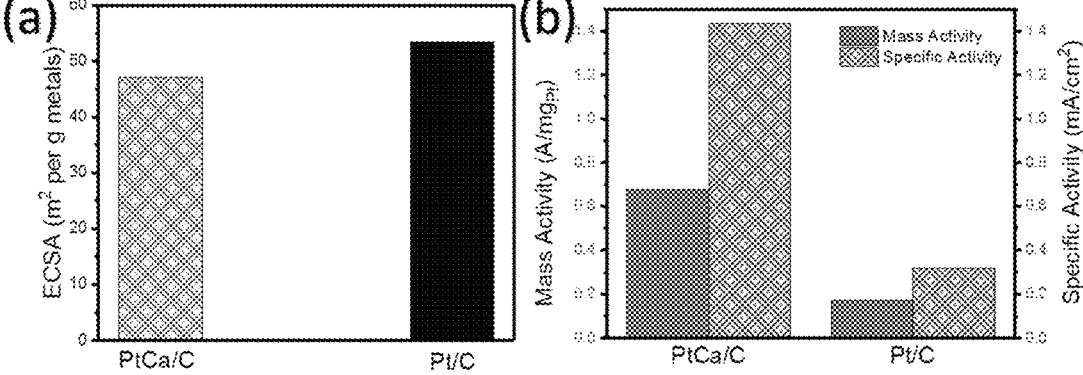
FIGS. 8A and 8B are views illustrating an electrochemical active surface area (ECSA) determined from a charge of hydrogen desorption by cyclic voltammetry, and mass activity and specific activity measured at 0.9 V (vs. RHE) of Example 1 and Comparative Example 3, respectively.

FIGS. 8A and 8B are views illustrating an electrochemical active surface area (ECSA) determined from a charge of hydrogen desorption by cyclic voltammetry, and mass activity and specific activity measured at 0.9 V (vs. RHE) of Example 1 and Comparative Example 3, respectively.

It was confirmed that ECSAs of Example 1 and Comparative Example 3 were 47.03 $m^2/g$ and 53.99 $m^2/g$, respectively, and the mass activity of Example 1 was 0.67 $A/mg_{Pt}$, which was about 4 times higher than that of Comparative Example 3 (0.17 $A/mg_{Pt}$), and it could be seen that the specific activity of Example 1 was also about 4.5 times higher than that of Comparative Example 3.

Additionally, an accelerated durability test (ADT) was performed for 10 k, 20 k and 30 k cycles in an oxygen-saturated 0.1 M $HClO_4$ solution under the condition in which a cyclic voltage was applied at a voltage of 0.6 to 1.1 V (vs. RHE) and a scan rate of 50 mV/S.

Figure 9:
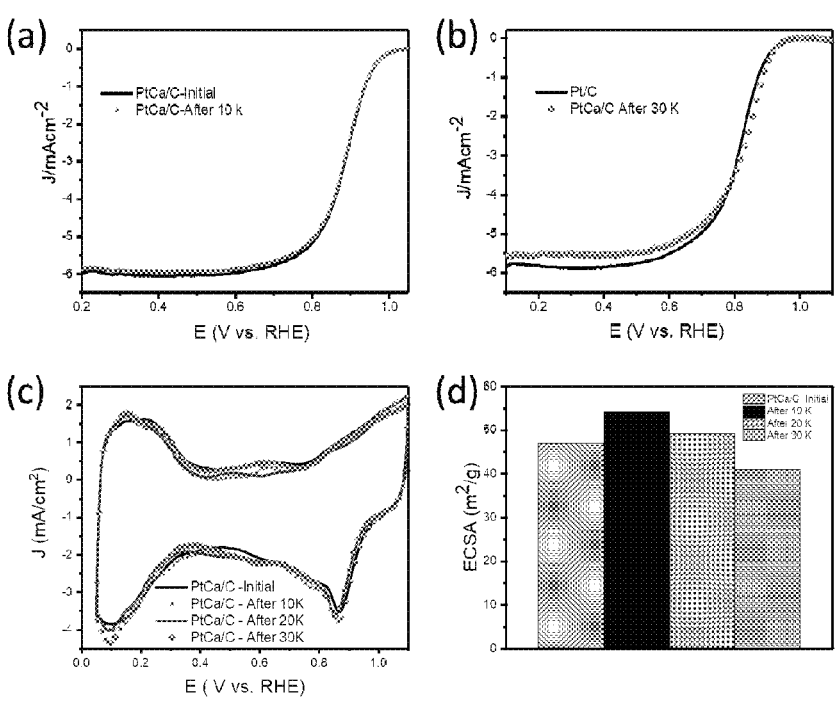
FIGS. 9A and 9B are views illustrating linear sweep voltammetry (LSV) curves measured at an initial stage (before an accelerated durability test (ADT) is performed) and after ADT is performed for 10 k cycles of Example 1, and LSV curves measured at an initial stage of Comparative Example 3 and after ADT is performed for 30 k cycles of Example 1, respectively.
FIGS. 9C and 9D are views illustrating cyclic voltammogram (CV) curves and electrochemical active surface areas (ECSAs) measured at the initial stage and after ADT is performed for 10 k, 20 k, and 30 k cycles respectively, for Example 1.

FIGS. 9A and 9B are views illustrating linear sweep voltammetry (LSV) curves measured at an initial stage (before an accelerated durability test (ADT) is performed) and after ADT is performed for 10 k cycles of Example 1, and LSV curves measured at an initial stage of Comparative Example 3 and after ADT is performed for 30 k cycles of Example 1, respectively. FIGS. 9C and 9D are views illustrating cyclic voltammogram (CV) curves and electrochemical active surface areas (ECSAs) measured at the initial stage and after ADT is performed for 10 k, 20 k, and 30 k cycles of Example 1, respectively.

As illustrated in FIG. 9A, it could be seen that even after ADT was performed for 10 k cycles, the LSV curve of Example 1 almost overlapped with the initial LSV curve, which showed that the activity was maintained. That is, it could be confirmed that the platinum-based alloy catalyst (PtCa/C) of Example 1 had significantly excellent durability. In addition, as illustrated in FIG. 9B, it was confirmed that the activity in Example 1 exhibited after 30 k ADT cycles was similar to the activity in Comparative Example 3, which again showed that the durability in Example 1 was significantly excellent. On the other hand, it was confirmed that in the LSV curve of Comparative Example 3, the half-wave potential was lowered by about 33 mV after 30 k cycles ADT compared to that in the initial stage.

As illustrated in FIG. 9D, it was confirmed that in Example 1, even after ADT was performed for 10 k, 20 k, and 30 k cycles, there was almost no loss of the electrochemical active surface area.

(Experimental Example 4) Characteristics of Fuel Cell Containing Platinum-Based Alloy Catalyst (PtCa/C)

The performance of the fuel cell was evaluated by applying the prepared platinum-based alloy catalyst as a cathode catalyst in a membrane electrode assembly (MEA).

The membrane electrode assembly was prepared by mixing each of the catalysts of Example 1 and Comparative Example 3 with 5 wt % of a Nafion ionomer solution, isopropanol, and deionized water to prepare a slurry, and then spray-coating the prepared slurry onto a Nafion 211 membrane (Dupont).

In order to test the performance of the proton exchange membrane fuel cell (PEMFC), commercial Pt/C (TKK, 19.4 wt % Pt) was applied as an anode catalyst. At this time, an area of the anode and the cathode was maintained at 5 $cm^2$.

Thereafter, the membrane electrode assembly was assembled with a commercial gas diffusion layer (GDL, SGL 39 BC) without hot-pressing.

The proton exchange membrane fuel cell was operated at 80° C. and a back pressure of 0.5 bar by supplying pure hydrogen at a relative humidity of 100% to the anode at a flow rate of 300 mL/min and supplying pure oxygen at a relative humidity of 100% to the cathode at a flow rate of 1,000 mL/min.

According to the United States Department of Energy (DOE) protocol, an accelerated durability test (ADT) was performed for 10 k, 20 k, and 30 k cycles by applying cyclic sweep in a range of 0.6 to 0.95 V with a rise time of 0.5 s.

Figure 10:
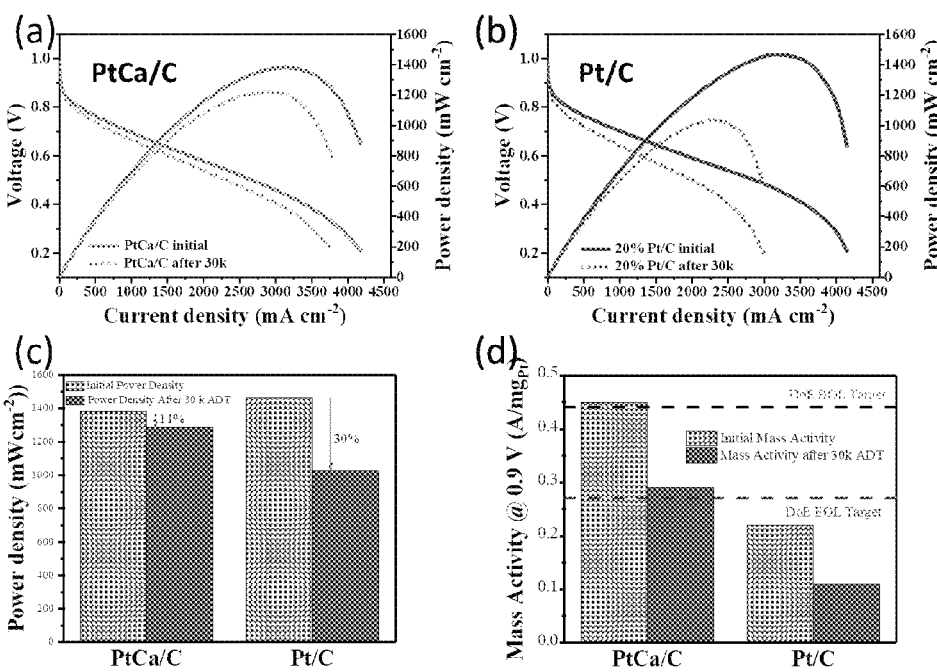
FIGS. 10A and 10B are views illustrating polarization curves and power density curves before and after an accelerated durability test performed for 30 k cycles of fuel cells to which composites of Example 1 and Comparative Example 3 are applied as cathode catalysts, respectively.
FIGS. 10C and 10D are views illustrating maximum power density changes and mass activity changes at 0.9 V before and after the accelerated durability test performed for 30 k cycles, respectively.

FIGS. 10A and 10B are views illustrating polarization curves and power density curves before and after an accelerated durability test (ADT) performed for 30 k cycles of fuel cells to which composites of Example 1 and Comparative Example 3 are applied as cathode catalysts, respectively. FIGS. 10C and 10D are views illustrating maximum power density changes and mass activity changes at 0.9 V before and after the accelerated durability test performed for 30 k cycles, respectively.

As illustrated in FIGS. 10A, 10B, and 10C, it could be confirmed that the initial maximum power density of the fuel cell containing the composite of Example 1 (1,380 $mW/cm^2$) was slightly lower than the initial maximum power density of the fuel cell containing the composite of Comparative Example 3 (1,465 $mW/cm^2$), but the maximum power density after the accelerated durability test for 30 k cycles was rather high in the fuel cell containing the composite of Example 1.

It could be seen that in the case of the fuel cell to which the composite of Example 1 was applied as a cathode catalyst, the maximum power density after the accelerated durability test for 30 k cycles was decreased by 11% compared to the initial power density, whereas in the case of the fuel cell to which the composite of Comparative Example 3 was applied as a cathode catalyst, the maximum power density after the accelerated durability test was decreased by 30% compared to the initial power density, which was consistent with the result of the accelerated durability test performed in Experiment Example 3 and showed that the durability of the fuel cell to which the composite of Example 1 was applied as a cathode catalyst was significantly superior to that of the fuel cell to which commercial Pt/C (20 wt % Pt) of Comparative Example 3 was applied as a cathode catalyst.

In addition, referring to FIG. 10D, it was confirmed that the initial mass activity of the fuel cell containing the composite of Example 1 was 0.45 $A/mg_{Pt}$ at 0.9 V and the mass activity after the accelerated durability test for 30 k cycles ($0.29$ A/mg$_{Pt}$) was decreased by about $35.6\%$, and on the other hand, it was confirmed that the mass activity of the fuel cell containing the composite of Comparative Example 3 was decreased by about $49.6\%$ compared to the initial stage after the accelerated durability test for 30 k cycles.

Such a result of the fuel cell containing the composite of Example 1 means that the fuel cell has significantly excellent durability to the extent that the mass activity exceeds the standards of the initial mass activity (at beginning-of-life (BOL)) ($0.44$ A/mg$_{Pt}$) and the mass activity after the end of the 30 k accelerated durability test (at end-of-life (EOL)) ($0.26$ A/mgpt, $40\%$ or more of the initial mass activity), which are the United States Department of Energy (DOE)'s 2020-2025 target.

Figure 11:
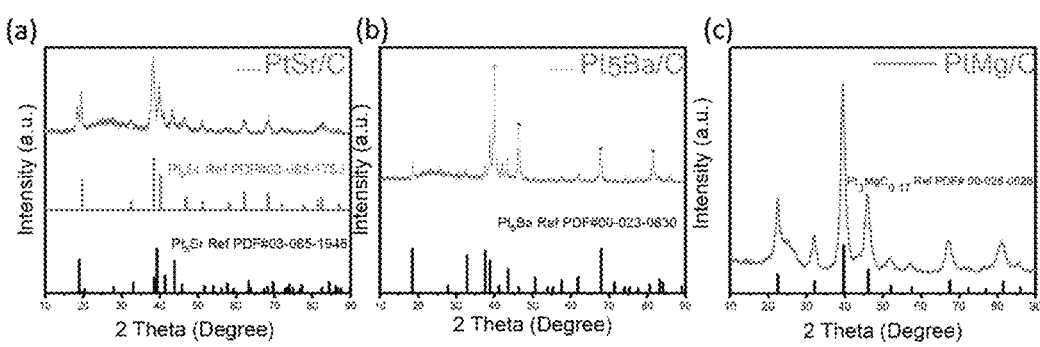
FIGS. 11A, 11B, and 11C are views illustrating XRD patterns of a particulate composite (PtSr/C) of Example 4, a particulate composite (PtBa/C) of Example 5, and a particulate composite (PtMg/C) of Example 6 that are produced according to an exemplary embodiment of the present invention, respectively.

(Experimental Example 5) Comparison of
Particulate PtMg/C, PtSr/C, and PtBa/C Catalysts
and Characteristics FIGS. 11A, 11B, and 11C are views illustrating XRD patterns of a particulate composite (PtSr/C) of Example 4, a particulate composite (PtBa/C) of Example 5, and a particulate composite (PtMg/C) of Example 6 that are produced according to an exemplary embodiment of the present invention, respectively.

FIGS. 11A to 11C show that all the synthesized Pt-alkaline earth metal alloys have high crystallinity, and the present synthesis method is a universally valid synthesis method that may present a new breakthrough in the particulate Pt-alkaline earth metal alloy for which the present synthesis method is difficult to apply due to a large difference in reduction potential. In addition, in further expansion here, although the data is not presented in the present invention, the present synthesis method is a synthesis method that may be universally applied to an early transition metal and an alloy of lanthanide and platinum for which the present synthesis method is difficult to apply similarly due to a large difference in reduction potential, and may be generalized to almost all synthesis.

In particular, it was confirmed that the composite of Example 5 was consistent with the specific peak (PDF #00-023-0830) data of Pt$_5$Ba/C and the composite of Example 6 was consistent with the specific peak (PDF #00-028-0626) data of Pt$_3$Mg/C$_{0.17}$. In addition, it was confirmed that all the composites of Examples 4 to 6 had a cubic crystal phase.

Figure 12:
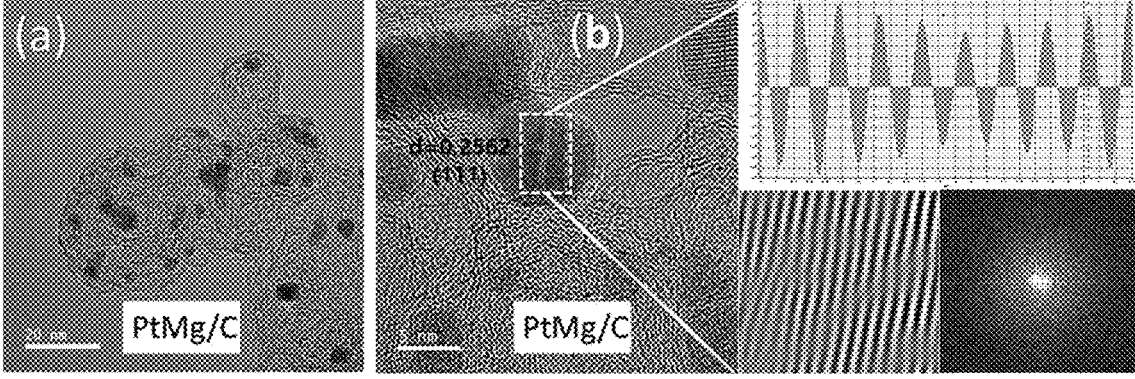
FIGS. 12A and 12B are views illustrating a TEM image at a low magnification (scale bar: 10 nm) and a TEM image at a high magnification (scale bar: 5 nm), and a lattice space and a Fast Fourier Transform (FFT) pattern image of a crystal plane of the composite of Example 6, respectively.

FIGS. 12A and 12B are views illustrating a TEM image at a low magnification (scale bar: 10 nm) and a TEM image at a high magnification (scale bar: 5 nm), and a lattice space and a Fast Fourier Transform (FFT) pattern image of a crystal plane of the composite of Example 6, respectively.

Referring to FIGS. 12A and 12B, it could be seen that the average size of the PtMg nanoparticles supported on the carbon support (commercial carbon, Ketjen Black EC 600JD) was about 5 nm and the lattice size of the crystal plane of the particle was $0.256$ nm, which showed that the crystal plane corresponded to the (111) plane of PtMg and was larger than the lattice size ($0.230$ mm) of the (111) plane of pure Pt. It was determined that the size of the lattice was increased because Mg having an atomic size larger than that of Pt entered the Pt lattice leading to a lattice expansion. Interestingly, it could be seen that most of the PtMg particles were encapsulated in a thin carbon layer, and accordingly, the XRD pattern was also consistent with the Pt$_3$MgC$_{0.17}$ structure.

Figure 13:
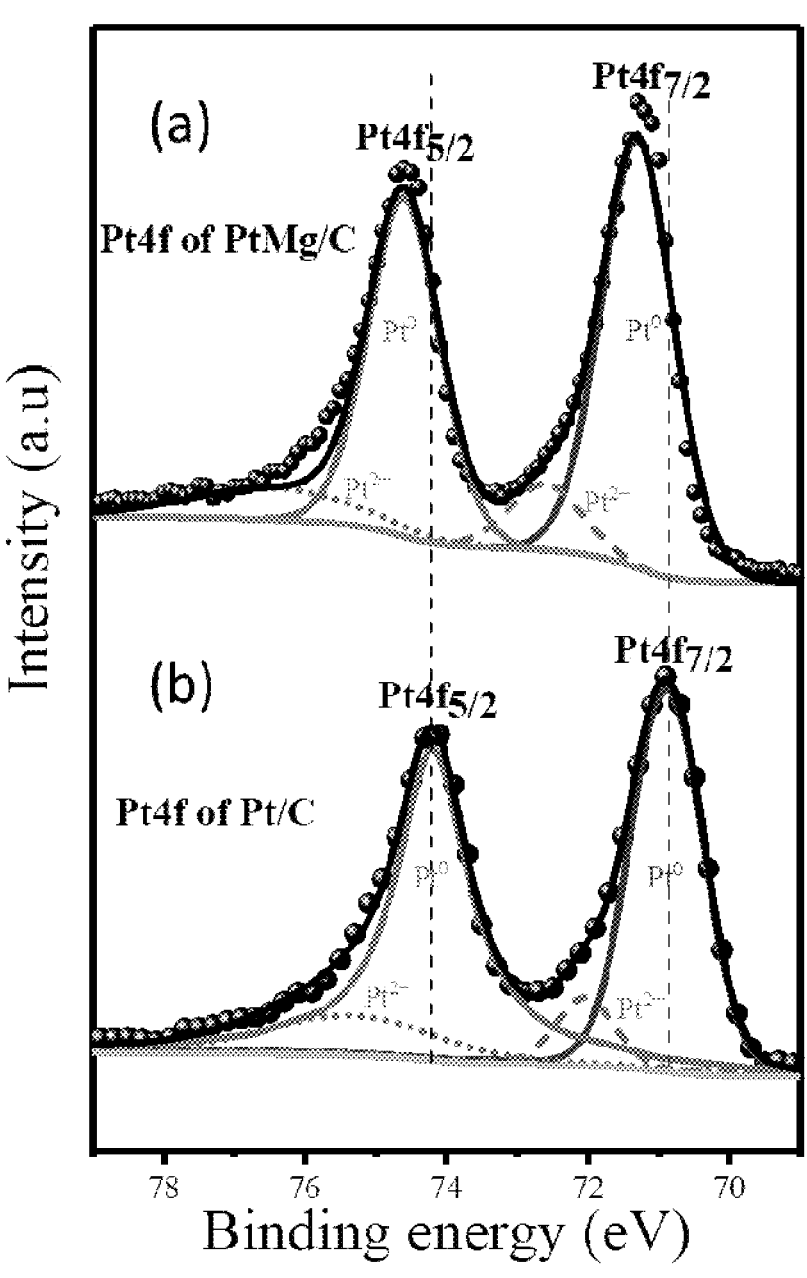
FIGS. 13A and 13B are views illustrating high-resolution Pt 4f XPS profiles of Example 6 (PtMg/C) and Comparative Example 3 (commercial Pt/C), respectively.

FIGS. 13A and 13B are views illustrating high-resolution Pt 4f XPS profiles of Example 6 (PtMg/C) and Comparative Example 3 (commercial Pt/C), respectively. It was confirmed that in the cases of Pt$_3$Mg/C and Pt/C, the binding energies of the Pt(0) peaks deconvoluted from the Pt 4f$_{7/2}$ peak were 71.4 and 70.9 eV, respectively, and as in Example 1 (PtCa/C), also in PtMg/C of Example 6, the peak was located at a higher binding energy by 0.5 eV compared to Pt/C.

It was confirmed that the binding energy of the Pt(II) peak deconvoluted from the Pt 4f$_{7/2}$ peak was 72.8 eV in Example 6 and 72.1 eV in Comparative Example 3, that is, Pt/C. It was confirmed that the Pt(II) peak deconvoluted from the Pt 4f$_{7/2}$ peak was located at a higher binding energy by 0.7 eV in PtMg/C compared to Comparative Example 3.

At this time, it was confirmed that, based on the binding energies of the deconvoluted Pt(0) and Pt(II) peaks corresponding to the peak of Pt 4f$_{7/2}$ in the XPS spectrum of commercial Pt/C, a difference between the binding energies of the deconvoluted Pt(0) and Pt(II) peaks corresponding to Pt 4f$_{7/2}$ in the XPS spectrum of PtMg/C, that is, a ratio (E1/E2) of a difference (E1) between the binding energies at the Pt(0) peaks to a difference (E2) between the binding energies at the Pt(II) peaks, was 0.71 at the Pt 4f$_{7/2}$ peak, which was a larger value than the ratio (E1/E2) value of 0.54 at the Pt 4f$_{7/2}$ peak of PtCa/C, and it was determined that the result was related to a severe lattice strain due to a large atomic size of Ca compared to Mg.

Figure 14:
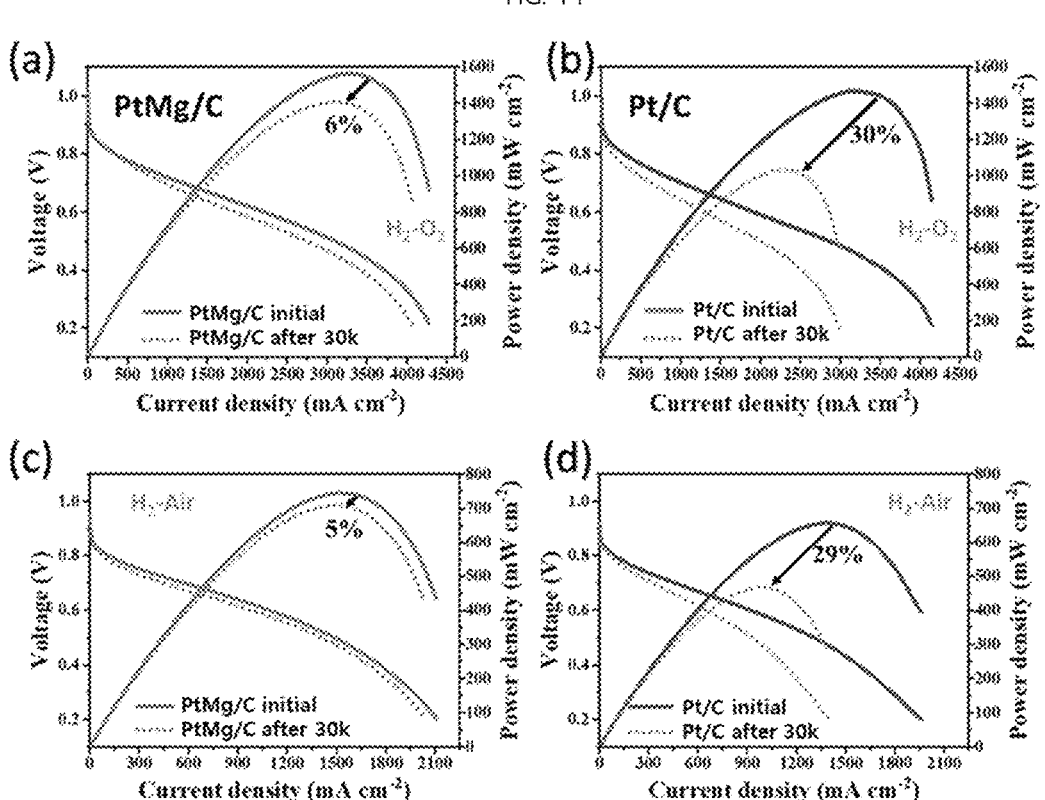
FIGS. 14A and 14B are views illustrating polarization curves and power density curves before and after an accelerated durability test performed for 30 k cycles of fuel cells to which the composites of Example 6 (PtMg/C) and Comparative Example 3 are applied as cathode catalysts under a H$_2$—O$_2$ condition, respectively.
FIGS. 14C and 14D are views illustrating polarization curves and power density curves before and after an accelerated durability test performed for 30 k cycles of fuel cells to which the composites of Example 6 (PtMg/C) and Comparative Example 3 are applied as cathode catalysts under a $H_2$-Air condition, respectively.

FIGS. 14A and 14B are views illustrating polarization curves and power density curves before and after an accelerated durability test performed for 30 k cycles of fuel cells to which the composites of Example 6 (PtMg/C) and Comparative Example 3 are applied as cathode catalysts under a H$_2$-O$_2$ condition, respectively, and FIGS. 14C and 14D are views illustrating polarization curves and power density curves before and after an accelerated durability test performed for 30 k cycles of fuel cells to which the composites of Example 6 (PtMg/C) and Comparative Example 3 are applied as cathode catalysts under a H$_2$-Air condition, respectively.

As illustrated in FIGS. 14A and 14B, the initial maximum power density of the fuel cell containing PtMg/C under the H$_2$-O$_2$ condition ($1,580$ mW/cm$^2$) was higher than the initial maximum power density of the fuel cell containing the composite of Comparative Example 3 ($1,465$ mW/cm$^2$), which showed that the activity was excellent. The maximum power density of the fuel cell containing PtMg/C after the accelerated durability test for 30 k cycles was decreased by only $6\%$ unlike Comparative Example 3 in which the maximum power density was decreased by $30\%$, which showed that the activity and the stability were significantly excellent.

In the H$_2$-Air condition, a phenomenon similar to that in the H$_2$-O$_2$ condition was observed. The initial maximum power density of the fuel cell containing PtMg/C under the H$_2$-Air condition ($740$ mW/cm$^2$) was higher than the initial maximum power density of the fuel cell containing the composite of Comparative Example 3 ($655$ mW/cm$^2$), which showed that the activity was excellent, and the maximum power density of the fuel cell containing PtMg/C after the accelerated durability test for 30 k cycles was decreased by only $5\%$ unlike Comparative Example 3 in which the maximum power density was decreased by $29\%$, which showed that the activity and the stability were significantly excellent. This result showed that the durability of the fuel cell to which the composite of PtMg/C produced according to an exemplary embodiment of the present invention was applied as a cathode catalyst was significantly superior to that of the fuel cell to which the composite (commercial Pt/C (20 wt % Pt)) of Comparative Example 3 was applied as a cathode catalyst.

As set forth above, the composite according to the present invention contains a carbon support and a binary alloy composed of platinum (Pt) and an alkaline earth metal supported on the carbon support, and satisfies a specific condition in a Pt 4f X-ray photoelectron spectroscopy (XPS) spectrum of the binary alloy measured by XPS, such that the composite has cost-effectiveness, an excellent catalytic activity, and significantly improved stability compared to a pure platinum catalyst according to the related art in an oxygen reduction reaction or a hydrogen evolution reaction.

Further, a particulate composite in which platinum and an alkaline earth metal are alloyed may be provided through simple processes such as a solvothermal synthesis method and a heat treatment.

Hereinabove, although the present invention has been described by specific parameters and limited exemplary embodiments, they have been provided only for assisting in the entire understanding of the present invention. Therefore, the present invention is not limited to the above exemplary embodiments. Various modifications and changes may be made by those skilled in the art to which the present invention pertains from this description.

Therefore, the spirit of the present invention should not be limited to the described exemplary embodiments, but the claims and all modifications equal or equivalent to the claims are intended to fall within the spirit of the present invention.

What is claimed is:

1. A method of producing a composite, the method comprising:
    a step a) of preparing a mixed solution containing a platinum precursor, an alkaline earth metal precursor, a first reducing agent, and an aprotic organic solvent by dissolving the platinum precursor, the alkaline earth metal precursor, and the first reducing agent into the aprotic organic solvent;
    a step b) of preparing a colloid containing a synthetic product by performing a first heat treatment on the mixed solution at a temperature equal to or higher than a boiling point of the aprotic organic solvent and then naturally cooling the mixed solution;

a step c) of obtaining the synthetic product by centrifuging the colloid;
    a step d) of mixing the synthetic product with a powdery second reducing agent, applying the synthetic product mixed with the powdery second reducing agent onto a carbon support, and then performing a second heat treatment in an inert reducing atmosphere to induce alloying between platinum and an alkaline earth metal to provide an alloyed synthetic product; and
    a step e) of removing impurities included in the alloyed synthetic product through an acid treatment.

2. The method of claim 1, wherein the steps a), b), and d) are performed under anhydrous and anoxic conditions.

3. The method of claim 1, wherein the first heat treatment in the step b) is performed for 11 to 30 hours.

4. The method of claim 3, wherein the synthetic product in the step b) contains crystalline platinum (Pt) and an amorphous alkali metal.

5. The method of claim 1, wherein the second heat treatment is performed at a temperature of 300 to 1,000° C.

6. The method of claim 1, wherein the alkaline earth metal precursor is chloride containing one or more selected from calcium (Ca), magnesium (Mg), strontium (Sr), barium (Ba), radium (Ra), and beryllium (Be).

7. The method of claim 1, wherein the aprotic organic solvent is one or more selected from acetonitrile, dimethylacetamide (DMAc), dimethylformamide (DMF), dimethyl sulfoxide (DMSO), methyl ethyl ketone, methyl n-propyl ketone, N-methylpyrrolidone (NMP), propylene carbonate, nitromethane, sulfolane, and hexamethylphosphoramide (HMP).

8. The method of claim 1, wherein a platinum overlay is formed on a surface of the alloyed synthetic product by the acid treatment in the step e).

9. The method of claim 1, wherein the alkaline earth metal precursor is chloride containing radium (Ra).

10. The method of claim 1, wherein
    the performing the second heat treatment in the inert reducing atmosphere to induce alloying between platinum and the alkaline earth metal forms a binary alloy, and
    the binary alloy is one or more selected from particulate PtSr, $Pt_2Ca$, $Pt_3Mg$, and $Pt_5Ba$.

* * * * *